Sept. 10, 1929.                K. IMHOFF                1,727,601
                        OSCILLATING AERATING PIPE
                            Filed June 18, 1927

Witnesses:                                      Inventor:
                                                Karl Imhoff Patented Sept. 10, 1929.

1,727,601

UNITED STATES PATENT OFFICE.

KARL IMHOFF, OF ESSEN, GERMANY.

OSCILLATING AERATING PIPE.

Application filed June 18, 1927. Serial No. 199,781.

To submerged contact aerators for sewage treatment, compressed-air is supplied from below, to make them capable of acting as a bacterial filter. For this purpose, a perforated air supply pipe is used that is slowly oscillated below the aerator.

The present invention relates to improved means for suspending and operating said pipe in such a way that a perfectly uniform distribution of the air supplied therethrough over the whole bottom of the aerator is attained.

Figure 1:
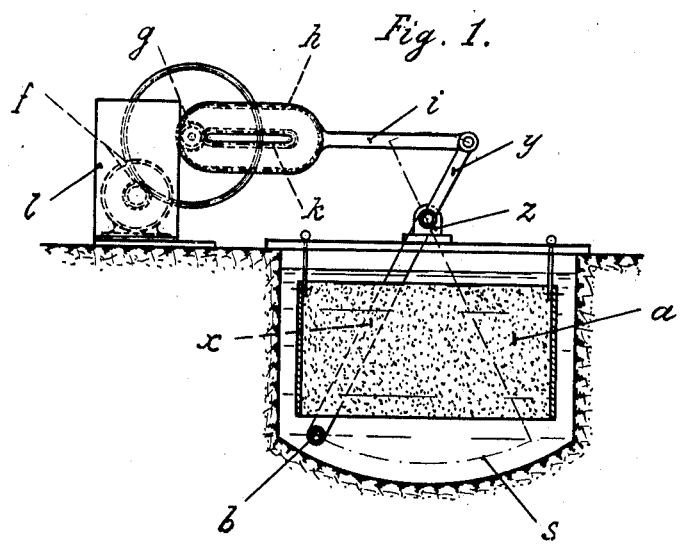
Figure 2:
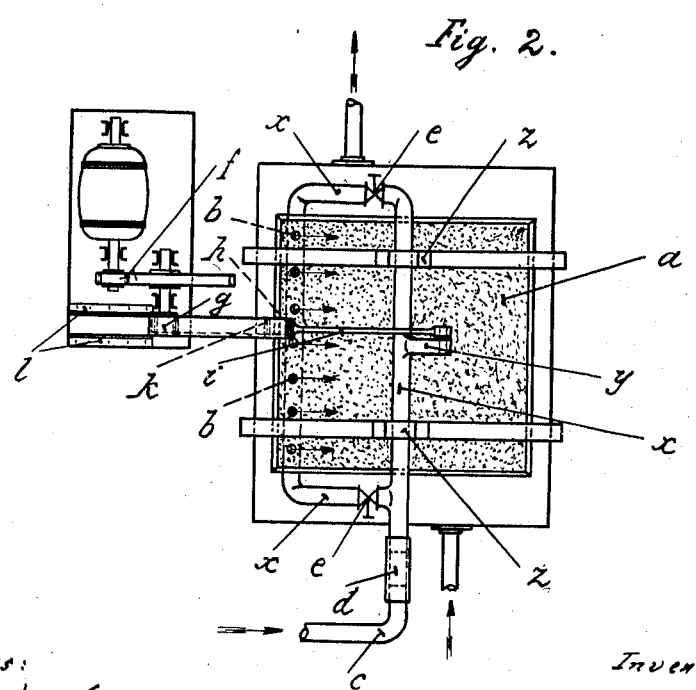

The accompanying drawing shows diagrammatically by way of example how the invention can be put into practice: Figs. 1 and 2 being respectively a side view partly in section and a plan view of the contact aerator submerged in an aeration tank and of the oscillating air supply pipe underneath with its accessories.

The air supply pipe $b$ lies below the bottom of the aerator $a$ and forms the lower part of a rectangular tubular frame $x$ surrounding the aerator and oscillatingly mounted at its upper part in fixed bearings $z$ above the middle of the aerator in such a way that during the reciprocation of said tubular frame $x$ the air supply pipe $b$ swings to and fro over the whole bottom of the aerator (see dotted line $s$, Fig. 1). Said tubular frame $x$ is open at one end of its upper part and there connected by means of a rubber pipe $d$ to the compressed-air supply conduit $c$. Control valves $e$ in both lateral members of the tubular frame $x$ serve for a uniform distribution of the air over the whole length of the pipe $b$.

To about the middle of the upper member of the tubular frame $x$, an upwardly extending arm $y$ is fixed and pivoted at its free end to a connection-rod $i$ that is integral with a laterally open frame comprising an endless toothed rack $h$ and a likewise endless guiding race $k$ integral therewith and parallel thereto, a driving pinion $g$ engaging laterally into said frame $h$, $k$ in such a way that it meshes with said toothed rack while it is in loose contact with said guiding race. Said pinion $g$ is keyed on a revolubly mounted shaft that is motor-driven by a transmission gearing $f$.

By the rotation of said driving pinion $g$, it rolls along the toothed rack $h$ while meshing therewith and slides upon the guiding race $k$, thereby continuously reciprocating said frame $h$, $k$, which is guided during its reciprocation between two stationary guiding walls $l$. By the reciprocation of the frame $h$, $k$ also the tubular frame $x$ is oscillated in its bearings $z$ and thereby the air supply pipe $b$ is continuously moved to and fro over the whole bottom of the aerator $a$.

By the provision of the endless toothed gearing $h$ meshing with the driving pinion $g$, the reciprocation of the air supply pipe $b$ takes place in a perfectly uniform way without any shocks or retardations at the ends of its strokes; this being—in connection with the control valves $e$—essential for a perfectly uniform distribution of the air supplied over the whole bottom of the aerator $a$.

The rubber pipe $d$ permits the device being quickly connected to or disconnected from the air supply conduit $c$.

It is immaterial whether in the frame $h$, $k$ the toothed rack lies at the outer side and the guiding race at the inner side thereof (as illustrated), or vice versa.

Emphasis is to be laid upon the fact that the motion of the pipe $b$ is not harmonic but uniform beneath the bottom of the aerator $a$; that is to say the pipe $b$ moves at substantially constant speed from end to end into its travel, stopping quickly at the sides of the tank and then reversing. This movement is due to the action of the rack and pinion. Hence no more air is supplied to one point below the bottom of the tank 2 than at any other and the air which rises through the tank $a$ is uniformly distributed through its contents.

What I claim, is:—

1. The combination with a submerged contact aerator for sewage treatment, of an air supply pipe at the bottom thereof, and means to oscillate said pipe at substantially constant speed from end to end of its travel beneath the whole bottom of the aerator.

2. The combination with a submerged contact aerator for sewage treatment, and a rectangular tubular frame surrounding said aerator and at its upper part oscillatingly mounted above the aerator, the lower part of said tubular frame forming a perforated pipe to discharge air beneath the aerator.

3. In a construction as specified in claim 2, means to oscillate said tubular frame and said air supply pipe at substantially constant speed from end to end of its travel over the whole bottom of the aerator.

4. The combination with a submerged contact aerator for sewage treatment, a tubular frame surrounding the aerator and oscillatingly supported at points above the aerator, the lower part of the frame having perforations for the exit of air therefrom, connections for supplying air to the interior of said frame to be discharged beneath the aerator, an arm projecting from the upper part of the frame, an operating rod joined to said arm, an endless toothed-rack carried by said arm, and a rotatable pinion engaging said rack to reciprocate the rod and rock said frame.

In testimony whereof I have hereunto set my hand.

KARL IMHOFF.